Aug. 21, 1928.

H. D. BLASI 1,681,761

SAFETY AEROPLANE

Filed Aug. 12, 1926

Inventor
H. D. Blasi
By
Attorney

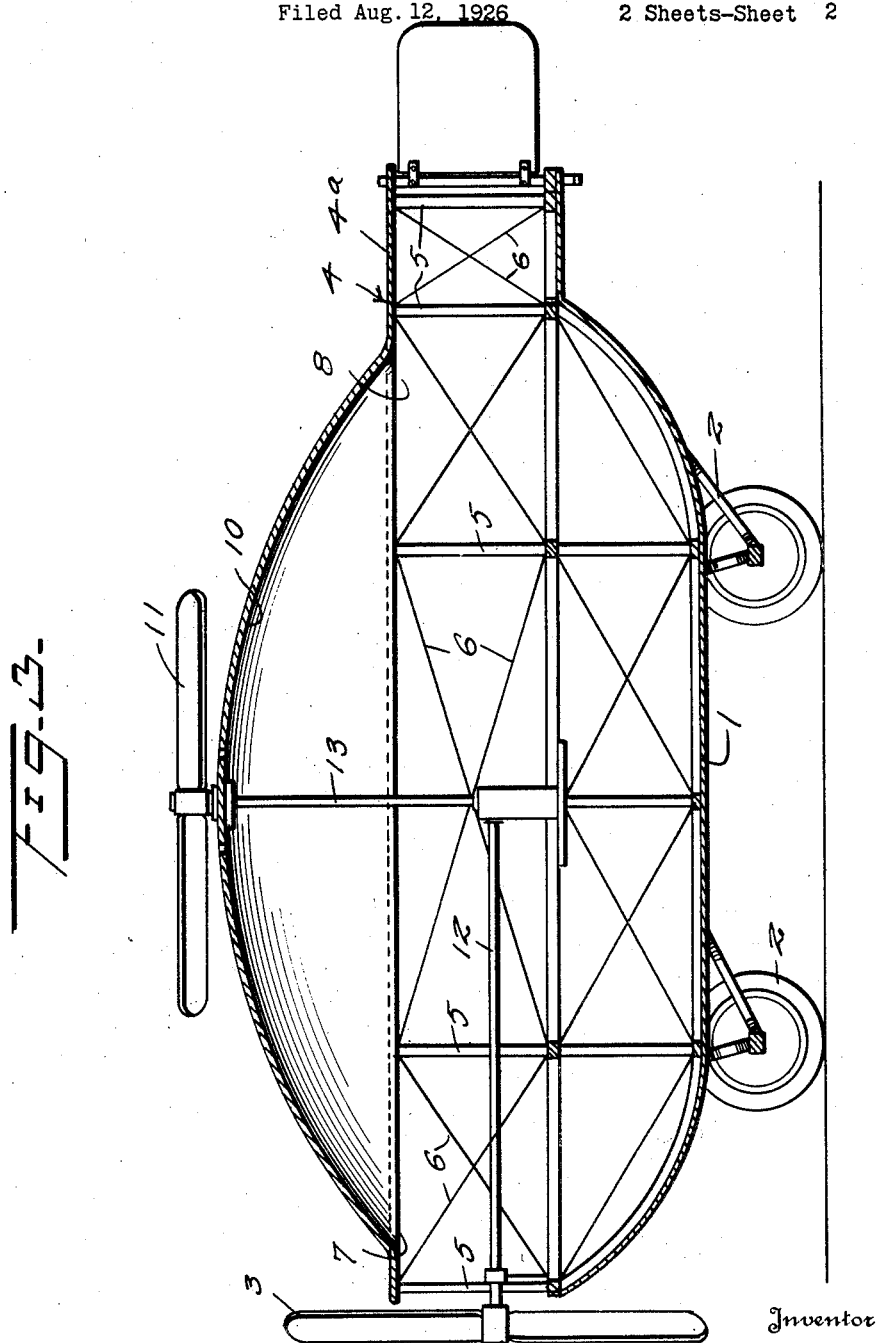

Patented Aug. 21, 1928.

1,681,761

UNITED STATES PATENT OFFICE.

HARVEY D. BLASI, OF DETROIT, MICHIGAN.

SAFETY AEROPLANE.

Application filed August 12, 1926. Serial No. 128,787.

This invention relates to aeroplanes, and has for one of its objects an aeroplane of this character which will gradually descend in a substantially straight line in the event that its propelling mechanism ceases to function, and to attain this end comprehends the employment of a plane or wing provided with a semi-sperical or substantially semi-spherical hollow portion extending upwardly from the wing at the center of gravity of the aeroplane and adapted to function as a parachute during the descent of the aeroplane.

The invention has other objects in view, the nature of which will become apparent as the description proceeds, and it is hereinafter fully described and claimed, and illustrated in the accompanying drawings, wherein:

Figure 3 is a sectional view taken on a plane extending centrally and longitudinally through the plane or wing of the aeroplane.

Corresponding and like parts are referred to in the following description, and designated in the accompanying drawings, by similar reference characters.

Figure 2:
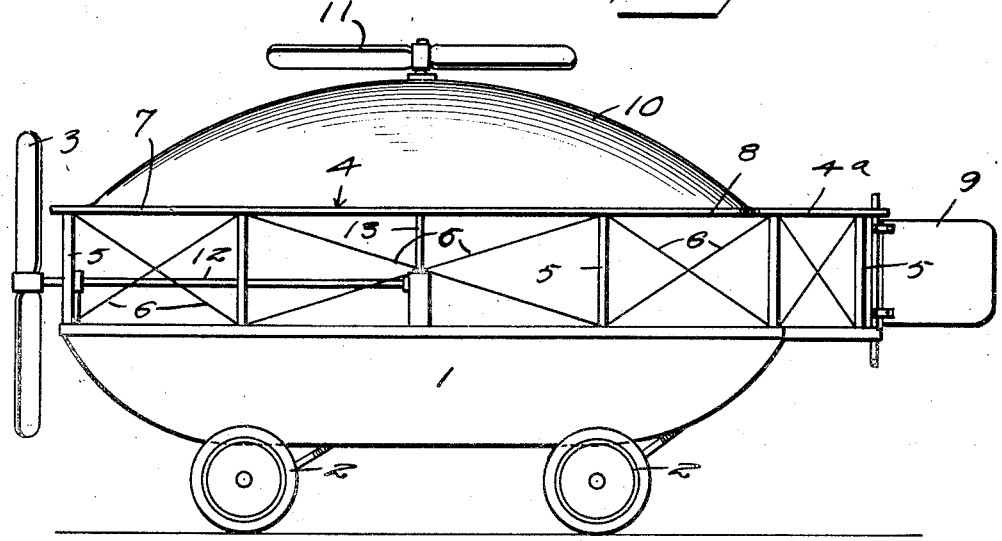
Figure 2 is a view in side elevation of the aeroplane.
Figure 1:
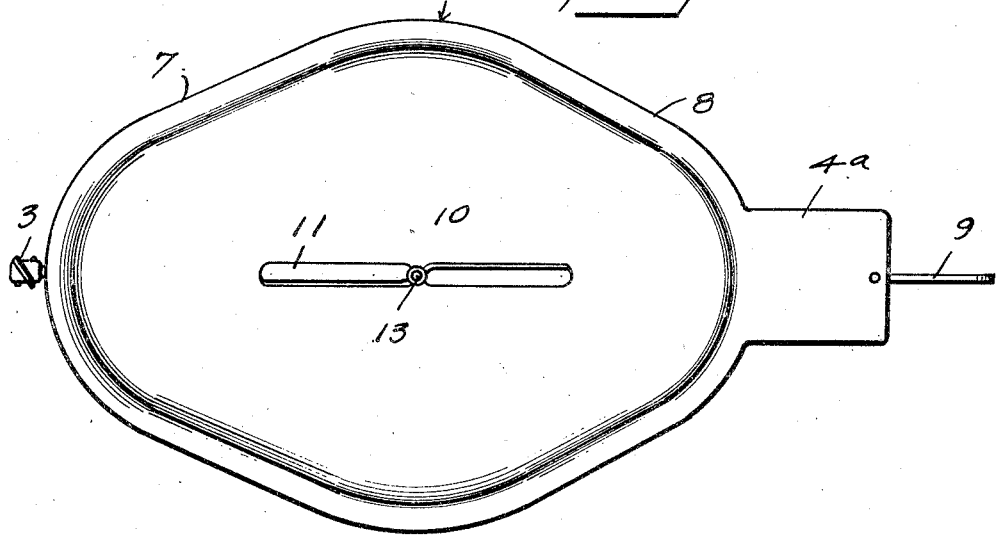
Figure 1 is a top plan view of an aeroplane embodying my invention.

The aeroplane comprises a fuselage 1, a landing gear 2, and a forward thrust propeller 3, all of which parts may be of any well known or appropriate construction. The aeroplane also comprises a plane or wing 4 which overlies the entire fuselage 1 and extends at the center of gravity of the machine laterally beyond the fuselage. The fuselage 1 and wing 4 are connected together by struts 5 of usual construction, and the usual stay wires 6 are connected to the struts. The wing 4 is of substantially diamond formation in plan. The forward or leading edges of the wing 4 are designated 7, and the rearward or trailing edges thereof are designated 8. The widest portion of the wing 4 extends across the fuselage 1 at the center of gravity of the machine. At its rearward end the wing 4 is provided with a substantially rectangular extension 4ᵃ to the rearward end of which is secured a rudder 9 of any well known or appropriate construction. At the center of its widest portion, the wing 4 is provided with a hollow upstanding portion 10 which may be semi-spherical or substantially semi-spherical or of any other suitable formation and which functions as a parachute to cause the aeroplane to descend in a substantially straight line in the event that its propelling mechanism ceases to function. If desired the aeroplane may be provided with a lifting propeller 11 which is located directly above the plane part 10 and adapted to rotate about the vertical axis of said part. The shafts 12 and 13 of the forward thrust propeller 3 and lifting propeller 11 are suitably connected to a power plant, not shown, mounted in the fuselage 1.

Due to its laterally enlarged central portion and to its general contour in plan and longitudinal section, the wing 4 will maintain the aeroplane on an even keel while in flight. If for any reason, such as the breakdown of its power plant, the forward flight of the aeroplane should cease, the wing 4 will, due to its general contour in plan and its upstanding hollow part 10, cause the aeroplane to descend gradually in a substantially straight path.

It should be understood that the drawings are merely illustrative and do not pretend to give exact proportions. Furthermore, the said drawings are illustrative of a preferred construction, it being my expectation that various changes and modifications may be made without departing from the spirit and scope of my invention.

What is claimed is:—

An aeroplane having a wing of substantially diamond formation in plan and provided at its widest part with an upstanding hollow portion of substantially semi-spherical formation.

In testimony whereof I affix my signature.

HARVEY D. BLASI.